April 12, 1960 — J. O. CROUSE — 2,932,214
CONTROL DEVICE
Filed Dec. 18, 1957

INVENTOR.
John O. Crouse
BY
Attorneys

United States Patent Office 2,932,214
Patented Apr. 12, 1960

2,932,214

CONTROL DEVICE

John O. Crouse, Mansfield, Ohio, assignor to Richland Auto Parts Company, Mansfield, Ohio, a corporation of Ohio Application December 18, 1957, Serial No. 703,518

6 Claims. (Cl. 74—502)

My invention relates to control devices and more particularly to such devices which are adapted to control the speed of an engine from a handle mounted on a dashboard or instrument panel. The type of control mechanism over which the present invention is an improvement is clearly set forth in United States Letters Patent No. 2,234,623 to Oliver P. Crouse, issued March 11, 1941. The device comprises, generally, a Bowden type cable connected to a longitudinally adjustable rod mounted in a dashboard at one end thereof whereby actuation of said handle effects movement of an accelerating mechanism at a point remote from said rod.

In such devices, it is highly desirable that means be provided to prevent the control rod and cable from being longitudinally displaced during use due to vibration, shock, or the normal bias of the accelerating mechanism to return to idle position. Vibration and shock are particular problems in aircraft control mechanisms wherein it is essential to safety that the throttle remain in its adjusted position.

The primary object of my invention is to provide a control mechanism of the above type having means for exerting a controlled, frictional drag on the control rod.

Another object of my invention is to provide such a device whereby the control rod can be locked in any adjustable position.

Still another object of my invention is to provide a control device as set forth above which operates smoothly and is not subject to binding.

It is also an object of my invention to provide such a device which is simple to make and requires few manufacturing operations.

Other objects of my invention and the invention itself will be readily understood from the following specification and the appended drawings.

Figure 1:
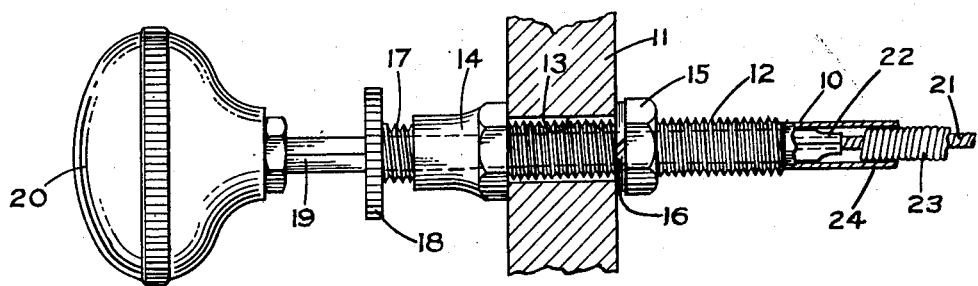
Fig. 1 is a plan view in partial section of the improved control device of my invention.

Referring now to the figures of the drawings, in all of which like parts are designated by like reference characters, and particularly to Fig. 1, at 10 I show a tubular support mounted in an instrument panel 11. The support 10 is threaded as indicated at 12 over a substantial portion of the length of said support, said threaded portion projecting through a suitable aperture 13 in the panel 11 and being secured therein by means of an internally threaded sleeve 14 at the front of said panel and by a nut 15 and a washer 16 at the rear of said panel. An externally threaded, axially bored detent element 17 having a knurled flange 18 is screw-thread fitted into the forwardly projecting end of the sleeve 14. The bore of said detent element is coaxial with the bore of the support 10, and a cross-sectionally noncircular control rod 19 having a handle 20 secured to the forward end thereof is telescoped through said sleeve and said support.

A flexible cable 21 is secured in a conventional manner to the rearwardly directed end of the control rod 19 within the support 12 as indicated at 22. The cable 21 is encased in a flexible housing 23 of any suitable form as, for example, a single strand of wire forming contiguous, coaxial coils through which said cable is adapted to slidably fit. The housing 23 is rigidly interfitted with the support 10 at the rearward end of said support as indicated at 24. The rearwardly directed end of the cable 21 is suitably secured to an accelerating mechanism or other device, not herein illustrated, which is to be controlled remotely by means of the handle 20. By moving said handle inwardly or outwardly, the cable 21 is caused to move longitudinally within the housing 23 to effect a similar movement in the device to which it is attached at its rearward end.

Figure 2:
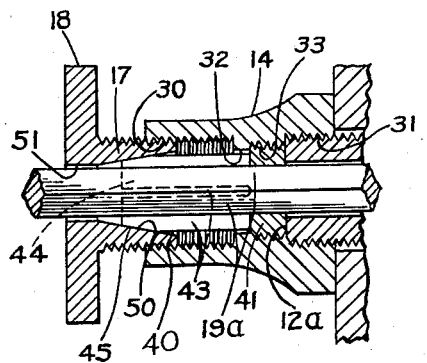
Fig. 2 is a fragmentary sectional detail of the device of Fig. 1.
Figures 3, 4:
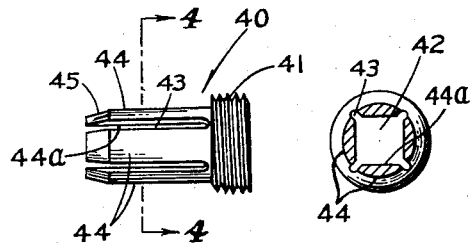
Fig. 3 is a plan view of the gripping element of Fig. 2.
Fig. 4 is a section taken along the line 4—4 of Fig. 3.
Figure 5:
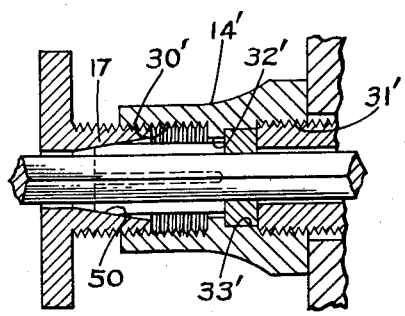
Fig. 5 is a view similar to Fig. 2 showing a second embodiment of my invention.
Figures 6, 7:
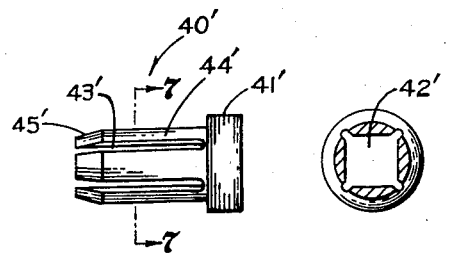
Fig. 6 is a plan view of the gripping element of Fig. 5.
Fig. 7 is a section taken along the line 7—7 of Fig. 6.

In Figs. 2 to 4 inclusive I show details of a first embodiment of the internal working mechanism contained by the sleeve 14 by which friction is adjustably applied to the control rod 19. Figs. 5 to 7 inclusive show details of a modification of the mechanism as shown in Figs. 2 through 4. Both forms of my invention operate in substantially the same manner, the difference between said forms being primarily in the assembly thereof.

Referring now to Fig. 2, the sleeve 14 is provided with an internally threaded portion 30 at its foremost end and an internally threaded portion 31 at its rearmost end. Intermediate the threaded portions 30 and 31 there is provided a diametrically reduced portion 32 internally threaded at 33 over a substantial portion of its length adjacent the threaded portion 31. A collet 40 is screw-thread fitted into the reduced portion 32 by means of an externally threaded, diametrically enlarged rear end portion 41 of said collet.

The collet 40 is externally round having an internal, noncircular, axial bore 42, herein illustrated as rectangular. Forward of the threaded portion 41, said collet is diametrically reduced and longitudinally slotted at 43 thereby providing forwardly projecting collet fingers 44. The forward portion of the collet 40 comprising the fingers 44 is diametrically smaller than the reduced portion 32 and said fingers project forwardly therefrom, the foremost ends of said fingers extending beyond the sleeve 14 and being forwardly tapered at 45.

The detent element 17, screw-thread fitted into the forward end of the sleeve 14 at the threaded portion 30 thereof, is provided with internal, tapered walls 50 complementarily formed to engage the forward taper 45 of the collet fingers 44, and is further provided with an axially aligned aperture 51 intersecting said tapered walls. The control rod 19, in the form shown, is preferably cross-sectionally rectangular and of such dimension as to slidably interfit the preferably rectangular bore 42 in the collet 40.

When the control device of my invention is assembled in the instrument panel 11, the threaded portion 12 of the support 10 interfits the threaded portion 31 of the sleeve 14, the forward end 12a of said support abutting the collet 40. Said collet is, therefore, held against displacement and the flat, inner surfaces 44a of the fingers 44 are contiguous with the flat outer surfaces 19a of the control rod 19.

To exert the desired tension on the control rod 19, the operator rotates the detent element 17 by means of the knurled flange 18 to tighten said element within the sleeve 14. This brings the tapered walls 50 tightly against the forward taper 45 of the fingers 44 thereby camming said fingers inwardly against the control rod 19. The frictional engagement between the finger surfaces 44a and the rod surfaces 19a can be increased or decreased by turning the detent element 17 inwardly or outwardly respectively, and if desired, said control rod can be locked against any longitudinal movement.

Referring now to Figs. 5 through 7, the second form of my invention is similar to the first form, and parts which are identical in both forms have been given like numbers. The modified parts which consist of the sleeve and the collet are designated by primed numbers, 14' and 40' respectively.

The sleeve 14' as shown in Fig. 8 is internally threaded at its forward and rearward ends as indicated at 30' and 31' respectively corresponding to the threaded portions 30 and 31 in the sleeve 14. Intermediate the threaded portions 30' and 31', the sleeve 14' is internally circumferentially reduced at 32', said intermediate portion having a socket 33' of relatively larger diameter adjacent said threaded portion 31'.

The collet 40' has an internal, noncircular bore 42', longitudinal slots 43', fingers 44', and a taper 45' identical with the bore 42, slots 43, fingers 44, and taper 45 of the first form of my invention. Instead of the threaded portion 41, however, the second form is provided with a circumferentially continuous, non-threaded flange 41' at its rearwardly disposed end. Said flange is adapted to slidably interfit the socket 33' whereby the fingers 44' project forwardly beyond the sleeve 14' to interfit the detent element 17. As in the first form of my invention, the forward end 12a of the support 10 abuts the collet 40' to hold it firmly and prevent displacement thereof. The detent element 17 operates identically in both forms, i.e. it is rotated inwardly to exert tension upon the control rod 19 and rotated ouwardly to release said tension.

From the foregoing description the advantages of my improved control device can be readily understood. The support 10 requires less machining due to the fact that the bore remains circular instead of being noncircular as in the patented device previously hereinbefore referred to. The support walls are thus of uniform thickness throughout their entire circumference and, therefore, stronger. Additionally, the provision of a circular bore prevents binding of the control rod within the support due to the lateral interspacing of the flat surfaces 19a from the concave walls of said bore.

A collet in this type of device is also subject to considerable wear due to its frictional contact with both the detent element 17 and the control rod, and in the present invention the same can be replaced quickly and easily without renewing the entire support. Since the cable housing 23 is rigidly secured to the support 10 as indicated at 24, it is obvious that the replaceable collet effects substantial savings in labor and pars.

The second form of my invention (Figs. 5–7) having a nonthreaded flange 41' provides the advantage of quicker assembly and replacement and requires relatively less machining to the collet. In both forms it is obvious that the support and the collet can be made from different materials suitable for specific purposes, such as metals of different hardness, resilience, etc.

It will be understood that many departures from the details of my invention as it is herein described and illustrated may be made, such as changes in size and dimension, without, however, departing from the spirit of my invention or the scope of the appended claims.

What I claim is:

1. A control device comprising a tubular support having a circular bore therethrough, a sleeve mounted concentrically upon one end of said support and having a free end projecting longitudinally therefrom, a detent element mounted at the free end said sleeve for longitudinal movement relative to said sleeve, said detent element being centrally bored and having tapered wall portions in said bore diverging in the direction of said sleeve, a collet having a noncircular bore mounted within said sleeve and providing finger portions projecting in the direction of said detent element, said finger portions having flat, inner surfaces and being forwardly tapered to complementarily interfit the divergent wall portions of said detent element, a noncircular control rod slidably projecting through said detent element and said collet, said control rod having flat outer surfaces contacting the flat inner surfaces of said collet fingers, said detent element movable in the direction of said collet whereby said collet fingers are cammed radially inwardly by said divergent wall portions to increase frictional contact between said flat inner and outer surfaces of said collet and said control rod respectively.

2. A control device comprising a tubular support having a circular bore therethrough, a sleeve mounted concentrically upon one end of said support and having a free end projecting longitudinally therefrom, a collet mounted within said sleeve having tapered finger portions projecting in the direction of said free end, said collet having a noncircular bore, a noncircular control rod slidably telescoped within said collet, a longitudinally bored detent element rotatably telescoped over said control rod and screw-thread fitted within the free end of said sleeve around the tapered portions of said fingers, said detent element having complementarily tapered inner wall portions adapted to engage said tapered portions of said fingers whereby when said detent element is turned to move longitudinally inwardly, said fingers are cammed radially inwardly to frictionally engage said control rod.

3. A control device comprising a tubular support having a longitudinal bore therethrough externally threaded at one end thereof, a sleeve screw-thread fitted upon the threaded end of said support having a free end projecting longitudinally therefrom, a collet mounted within said sleeve in abutment with said support, said collet having tapered finger portions projecting in the direction of said free end of said sleeve and a noncircular bore, a noncircular control rod slidably telescoped within said collet and projecting into said tubular support, said control rod being diametrically smaller in every transverse direction than said bore of said tubular support, a longitudinally bore detent element rotatably telescoped over said control rod and screw-thread fitted within the free end of said sleeve around said tapered finger portions, said detent element having complementarily tapered inner wall portions adapted to engage said tapered portions of said fingers, means for rotating said detent element for longitudinal movement in the direction of said collet whereby said tapered inner wall portions radially inwardly depress said fingers causing said fingers to frictionally engage said control rod.

4. A control device comprising a tubular support externally threaded at one end thereof, a sleeve in threaded engagement with the threaded end of said support having a free end projecting longitudinally therefrom, said sleeve having an internally circumferentially reduced portion adjacent said support providing an inward abutment for said support, a collet removably mounted within said reduced portion having tapered fingers projecting in the direction of said free end of said sleeve and a noncircular bore, a noncircular control rod slidably telescoped within said collet, a longitudinally bored detent element rotatably telescoped over said control rod and screw-thread fitted within the free end of said sleeve around said tapered fingers, said detent element having tapered inner wall portions diverging in the direction of said collet and adapted to complementarily engage said fingers, said detent element having a knurled flange for rotation thereof to apply pressure to said fingers.

5. A control device comprising a tubular support externally threaded at one end thereof, a sleeve in threaded engagement with the threaded end of said support having a free end projecting longitudinally therefrom, said sleeve having an internally circumferentially reduced portion adjacent said support, a collet screw-thread fitted into said reduced portion adjacent said support having tapered fingers projecting in the direction of said free end of said sleeve and having a noncircular bore, said sleeve having a further internally reduced portion adjacent said collet, said fingers projecting through said second mentioned reduced portion, said fingers having flat inner surfaces, a noncircular control rod slidably telescoped within said collet having flat outer surfaces, a longitudinally bored detent element rotatably telescoped over said control rod and threaded into said free end of said sleeve around said tapered fingers, said detent element having tapered inner wall portions diverging in the direction of said collet and adapted to complementarily engage said fingers, said detent element having means associated therewith for rotation thereof whereby said detent element is moved longitudinally to cam said fingers radially inwardly to cause the flat inner surfaces of said fingers to frictionally engage the flat outer surfaces of said control rod.

6. A control device comprising a tubular support externally threaded at one end thereof, said support having a longitudinal circular bore throughout its length, a sleeve in threaded engagement with the threaded end of said support having a free end projecting longitudinally therefrom, said sleeve having an internal socket adjacent said support, a collet slidably fitted in said socket having tapered finger portions projecting in the direction of said free end of said sleeve and having a noncircular bore, a noncircular control rod slidably telescoped within said collet, a longitudinally bored detent element rotatably telescoped over said control rod and threaded in said free end of said sleeve around said finger portions, said detent element having tapered inner wall portions diverging in the direction of said collet and adapted to engage said finger portions, said detent element having means associated therewith for rotation thereof whereby said detent element is moved longitudinally to cam said fingers radially inwardly into frictional engagement with said control rod.

References Cited in the file of this patent

UNITED STATES PATENTS

| | | |
|---|---|---|
| 2,112,722 | Weber | Mar. 29, 1938 |
| 2,134,756 | Gerry | Nov. 1, 1938 |
| 2,234,623 | Crouse | Mar. 11, 1941 |
| 2,319,041 | Crouse | May 11, 1943 |